United States Patent
Horelu et al.

(10) Patent No.: US 12,170,688 B1
(45) Date of Patent: Dec. 17, 2024

(54) AUTOMATED ATTACK MITIGATION

(71) Applicant: Amazon Technologies, Inc., Seattle, WA (US)

(72) Inventors: Adriana-Maria Horelu, Vancouver (CA); Jeffrey Allen Lyon, Woodinville, WA (US); Robert Benjamin Lang, Richmond (CA); Saket Tomer, Burnaby (CA); Krzysztof Jan Pado, North Vancouver (CA); John Shields, Redmond, WA (US); Ben Sangho Jae, Burnaby (CA); Matthew Hyun Seok Lee, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 352 days.

(21) Appl. No.: 17/491,387

(22) Filed: Sep. 30, 2021

(51) Int. Cl.
*H04L 9/40* (2022.01)

(52) U.S. Cl.
CPC ...... *H04L 63/1458* (2013.01); *H04L 63/0263* (2013.01); *H04L 63/1425* (2013.01); *H04L 63/20* (2013.01)

(58) Field of Classification Search
CPC ............ H04L 63/1458; H04L 63/0263; H04L 63/1425; H04L 63/20
See application file for complete search history.

(56) References Cited

U.S. PATENT DOCUMENTS

| | | | |
|---|---|---|---|
| 9,762,610 B1* | 9/2017 | Kwan | H04L 63/20 |
| 10,050,999 B1* | 8/2018 | Rossman | H04L 63/1416 |
| 10,623,429 B1* | 4/2020 | Vines | H04L 63/1458 |
| 10,911,471 B1* | 2/2021 | Song | G06N 20/00 |
| 11,075,934 B1* | 7/2021 | Aldhaheri | G06N 3/048 |
| 2003/0172289 A1* | 9/2003 | Soppera | H04L 63/1458 726/13 |
| 2008/0037441 A1* | 2/2008 | Kataria | H04L 12/2896 370/254 |
| 2013/0246619 A1* | 9/2013 | Raja | H04L 67/62 709/224 |
| 2015/0150123 A1* | 5/2015 | Be'ery | H04L 41/0686 726/22 |
| 2016/0065576 A1* | 3/2016 | Zhang | H04L 63/10 726/3 |
| 2017/0070531 A1* | 3/2017 | Huston, III | H04L 63/0428 |
| 2018/0084012 A1* | 3/2018 | Joseph | H04L 63/1425 |

(Continued)

FOREIGN PATENT DOCUMENTS

| | | | | |
|---|---|---|---|---|
| AU | 2021102049 A4 | * | 6/2021 | |
| CN | 110224876 A | * | 9/2019 | ........... H04L 41/145 |

(Continued)

*Primary Examiner* — Darshan I Dhruv

(74) *Attorney, Agent, or Firm* — Davis Wright Tremaine LLP

(57) ABSTRACT

A distributed denial of service attack is detected. In response to detection of the attack, application layer properties of network traffic associated with a web application under attack are analyzed. Changes to distributions of the application layer properties are identified. A signature is generated based, at least in part, on identifying a combination of application layer properties whose distributions have changed, and which identifies traffic increased since onset of the attack. A mitigation rule is generated based, at least in part, on the signature.

20 Claims, 7 Drawing Sheets

(56) References Cited

U.S. PATENT DOCUMENTS

| | | | |
|---|---|---|---|
| 2019/0132353 A1* | 5/2019 | Rodniansky | H04L 67/561 |
| 2019/0182274 A1* | 6/2019 | Doron | G06N 3/044 |
| 2021/0112079 A1* | 4/2021 | Campo Trapero | H04L 63/20 |
| 2021/0377217 A1* | 12/2021 | Antoche Albisor | G06F 21/577 |

FOREIGN PATENT DOCUMENTS

| | | | | |
|---|---|---|---|---|
| CN | 111181932 A | * | 5/2020 | H04L 63/1416 |
| WO | WO-2012098596 A1 | * | 7/2012 | H04L 41/0893 |
| WO | WO-2016035083 A2 | * | 3/2016 | G06F 21/55 |

* cited by examiner

AUTOMATED ATTACK MITIGATION

BACKGROUND

Increasingly, malicious actors may employ distributed denial of service ("DDoS") attacks to interfere with the provision of web-based services and applications. In a DDoS attack, a malicious actor may employ a large number of agent applications to simulate legitimate traffic to the targeted service or application. These attacks can be difficult to detect and mitigate because they mimic legitimate network traffic. Accordingly, techniques for detecting and mitigating DDoS attacks can be improved.

BRIEF DESCRIPTION OF THE DRAWINGS

Various techniques will be described with reference to the drawings, in which.

DETAILED DESCRIPTION

In an example, a technique for responding to a DDoS attack comprises identifying changes to the distribution of properties associated with a web application that is under attack. The changes are analyzed relative to the estimated onset time of the DDoS attack. Having identified one or more properties whose values have undergone a change in distribution, the technique further comprises identifying a combination of such properties that can serve as a signature of network traffic that is associated with the DDoS attack. A mitigation rule is then generated using a signature that matches a maximized amount of traffic observed after the onset of the DDoS attack, and excludes as much pre-onset traffic as possible, where excluding means that the properties associated with the rule are not associated with the pre-onset traffic. The mitigation rule therefore protects the application from attack, while minimizing the impact on legitimate traffic directed to the application. The signature rule can include the signature and one or more actions to take when traffic conforming to the signature is encountered by a web application firewall. The mitigation rule can then be used to configure the web application firewall to block or otherwise manage traffic believed to be associated with the DDoS attack, thereby mitigating the impact of the attack.

In a further aspect of the example technique, the onset of a DDoS attack is identified by measuring traffic directed at a web application and observing an unexpected or unexplainable increase in the amount of traffic directed to the application. When a DDoS attack is suspected, a workflow may be triggered to automatically generate one or more rules for mitigating the attack.

In a further aspect of the example technique, the properties associated with application layer network traffic are analyzed to identify changes in entropy. A reduction in entropy may be viewed as an increase in the concentration of a particular value in the distribution of a given property's values. For the entity behind a DDoS attack, it may be difficult to avoid using attack vectors that result in such changes. The example technique leverages this observation to identify a set of properties that could be suitable candidates for dynamically forming an attack signature suitable for identifying traffic associated with the attack.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
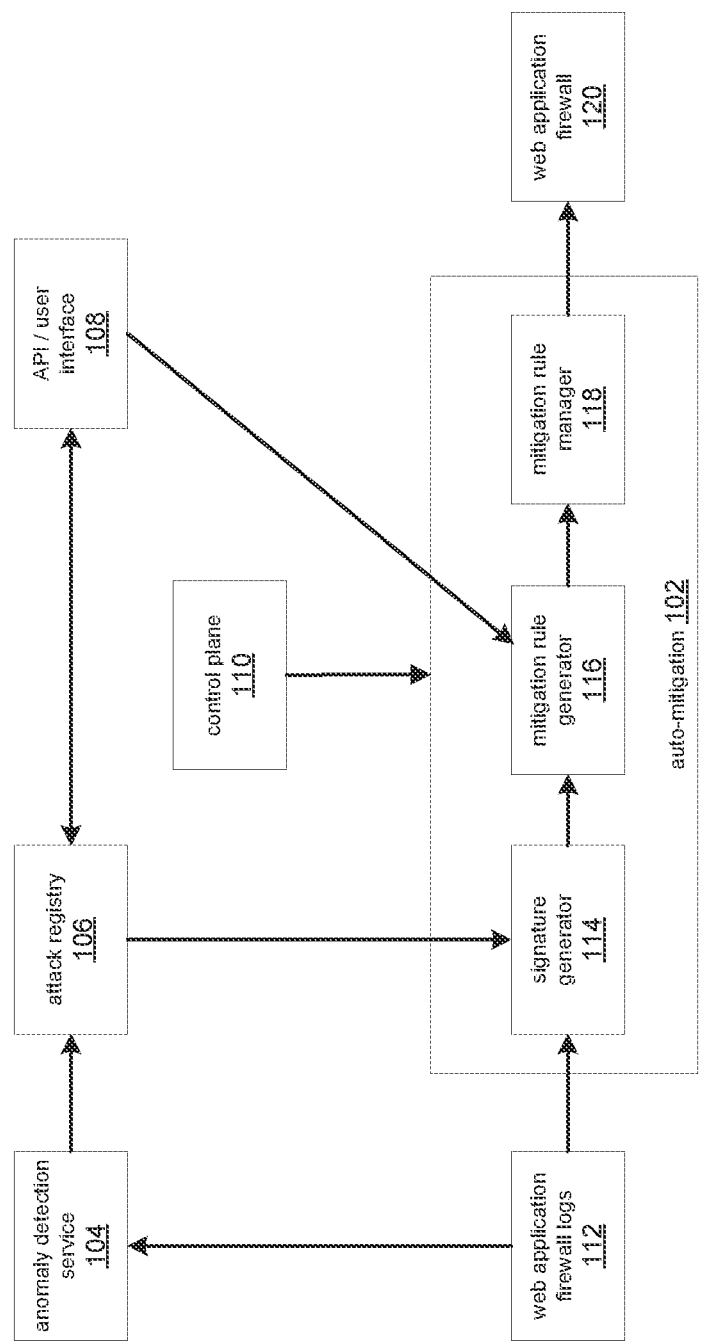
FIG. 1 illustrates an example of a system that performs automated attack mitigation, in accordance with an embodiment.

FIG. 1 illustrates an example of a system 100 that performs automated attack mitigation, in accordance with an embodiment. In the depicted example system 100, an auto-mitigation service 102 performs automated generation of rules that are applied to a web application firewall 120 to mitigate the effects of a distributed denial of service ("DDoS") attack. A DDoS attack can include any of a variety of malicious interactions with a web application, where the interactions collectively impact the operation of the targeted web application.

A web application includes any of various processes, components, modules, or services which receive and respond to application layer network communications. Here, application layer refers to the level(s) of communication over which applications communicate over a network. As described in the open systems interconnection ("OSI") model, the application layer is built upon other levels, and is distinct from other layers, such as the transport, network, data link, and physical layers. Communication at the application layer typically uses one or more application layer protocols, such as hypertext transfer protocol ("HTTP"), as a means of communicating between applications. These protocols are also built upon lower level protocols, touch as transport control protocol ("TCP") and Internet Protocol ("IP").

The web application firewall 120 acts at the application layer to manage, filter, inspect, or log traffic directed to a web application. The web application firewall 120 can be configured with rules that guide this activity. However, it can be difficult to configure these rules to allow for a timely and accurate response to a DDoS attack.

The web application firewall 120 generates data pertaining to the traffic it encounters. This can include the web application firewall log 112. In at least one embodiment, the web application firewall log 112 comprises one or more files in which requests directed to a web application are directed.

In at least one embodiment of the example system 100, an anomaly detection service 104 monitors data from a web application firewall log 112 to identify the onset of a DDoS attack.

The example system 100 may further include an attack registry 106 that receives notification, from the anomaly detection service 104, that a DDoS attack is underway. The attack registry 106 may record, transmit, or otherwise communication information about the attack to other components, modules, and services in the system.

In at least one embodiment, a control plane 110 initiates a workflow to be executed by the auto-mitigation service 102. The workflow, in at least one embodiment, is performed by components of the auto-mitigation service 102 which include a signature generator 114, a mitigation rule generator 116, and a mitigation rule manager 118.

The signature generator 114 analyzes properties of application layer network traffic, identifies properties of such traffic that is associated with the DDoS attack, and generates a signature combining one or more of the identified properties. The signature generator 114 selects properties to include in the signature by identifying a combination of properties that encompasses a maximum amount traffic that has increased since the onset of the DDoS attack, and encompasses a minimized amount of traffic that occurred prior to the onset, or which is otherwise considered or known to be legitimate.

In at least one embodiment, analysis of the traffic comprises examination of entropy changes for properties of network traffic directed to the web application, or applications, that are under attack. Under normal, pre-attack circumstances, the properties of this traffic may have some typical distribution. This can be considered, in embodiments, to be a baseline distribution. When a DDoS attack is underway, however, the distribution of these properties may change, such that a reduction in entropy can be observed in certain properties. For example, if the attackers are leveraging a particular type of browser in their attack, the distribution of a property that describes browser type might shift, to reflect an increasing proportion of traffic associated with the attacker. However, this property alone might encompass a significant amount of legitimate traffic. The signature generator 114 may therefore identify a plurality of properties whose entropy has declined since onset of the attack, and combine them to form a signature that can be used to identify traffic associated with the DDoS attack while including a minimized amount of legitimate network traffic.

The mitigation rule generator 116 generates a rule for the web application firewall based on the generated signature. The rule is applied by the web application firewall and causes the web application firewall to apply mitigation steps to traffic that conforms to the signature. For example, a rule might indicate that traffic conforming to a given signature should not be forwarded to the application. The rule might specify some alternative action, such as logging the traffic or routing the traffic to another destination. Here, conformance between a signature and network traffic refers to the properties of the signature matching those of the traffic. The mitigation rule is generated to maximize the amount of attack-related traffic that is affected, while minimizing the amount of legitimate traffic. This protects the application by allowing it to continue to serve legitimate clients during the duration of the attack.

The mitigation rule manager 118, in at least one embodiment, interfaces with the web application firewall to cause it to apply the rule. For example, the mitigation rule manager 118 may transmit commands to the web application firewall that causes the firewall to install and activate a rule generated by the mitigation rule generator 116.

In at least one embodiment, the example system 100 comprises an application programming interface ("API") or user interface 108, through which a client or user may interact with, consume, or control aspects of the automatic mitigation process.

Figure 2:
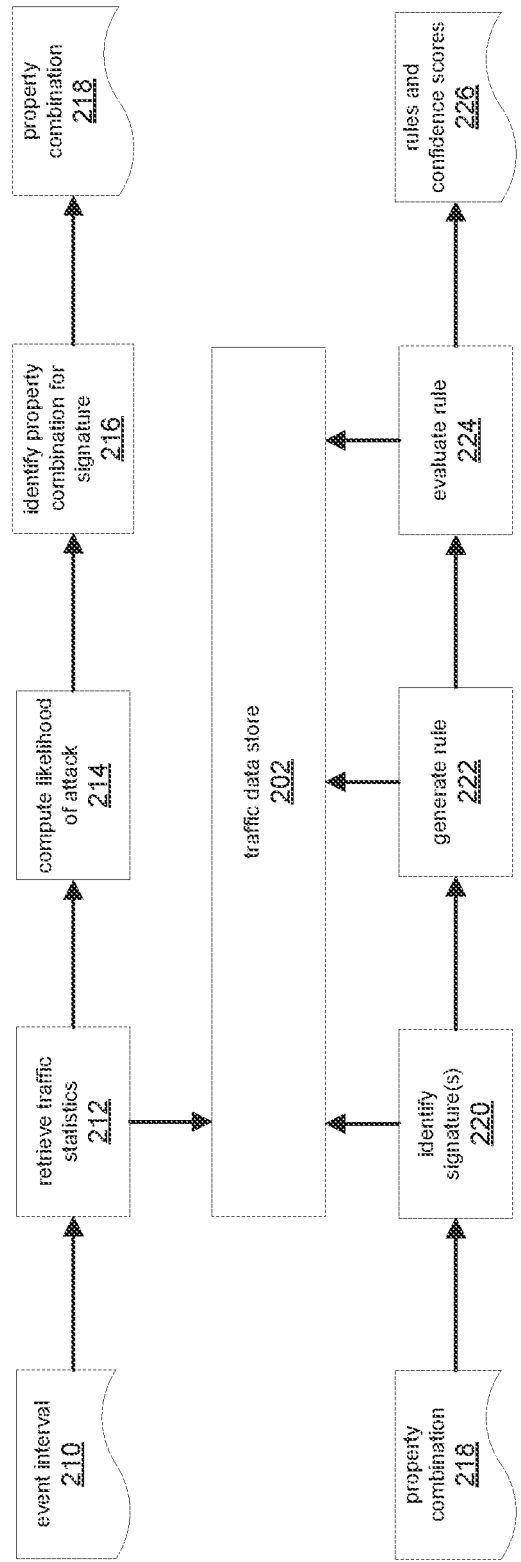
FIG. 2 illustrates an example of a process for performing automated attack mitigation, in accordance with an embodiment.

FIG. 2 illustrates an example of a process 200 for performing automated attack mitigation, in accordance with an embodiment. The example process 200 illustrates a process for generating a mitigation rule for a DDoS or other anomalous network traffic pattern. Examples of systems which may implement the depicted example process 200 include, but are not necessarily limited to, the example system 100 depicted in FIG. 1, or any other computing system or combination of computing systems.

In at least one embodiment, input to the process comprises an event interval 210, indicating a granularity or periodicity for analyzing anomalous traffic. At 212, a system implementing example process 200 retrieves traffic statistics from a traffic data store 202. The system then, at 214, computes a likelihood that an attack is underway, based on analysis of the traffic statistics.

At 216, the system identifies combinations of properties suitable for serving as a signature of the anomalous traffic. This may be done, in various embodiments, by analyzing various properties to identify distributions of values and changes in the entropy of those values. For example, the system may analyze the number of distinct values of a given property, and the number of times each distinct value has been observed. An increase in the concentration of a particular value, or set of values, may be observed as a reduction in entropy, while a decrease in such concentration may be observed as an increase in the entropy, or randomness, of the values. The system can treat properties exhibiting an increase in entropy, relative to the estimated onset time of the anomalous traffic, as candidates for combination into a signature. These property combinations 218 may be output and provided to step 220, which identifies a signature of the anomalous traffic.

In at least one embodiment, combinations of such properties are evaluated to find a combination that encompasses a maximum amount of traffic observed since the onset of the anomalous traffic, and a minimum amount of traffic observed prior to the onset. In at least one embodiment, selection of the combination is therefore based on the observed changes in entropy and the subset of traffic that is encompassed by the combination, before and after the suspected onset time. Accordingly, at 220 to 224, the system may evaluate candidate signatures and rules based on those signatures, consulting the traffic data store 202, to identify traffic matching a candidate signature. In at least one embodiment, the system computes a percentage traffic that is encompassed by the signature and that occurred after the estimated onset time, compared to all traffic or to traffic occurring before the estimated onset time. In either case, a relatively high percentage may indicate, in embodiments, that the candidate signature is an effective representation of the anomalous network traffic.

At 226, the system outputs rules and confidence scores. The system may derive the confidence scores from the percentages of traffic before and after the suspected onset time. A rule that encompasses little or no pre-onset traffic, and a large amount of post-onset traffic, may be awarded a high score since it largely accounts for the increase in traffic that typically accompanies a DDoS attack or other anomalous network traffic pattern. Conversely, rules that encompass greater amounts of pre-onset traffic, or proportionally less post-onset traffic, may be awarded low confidence scores.

Figure 3:
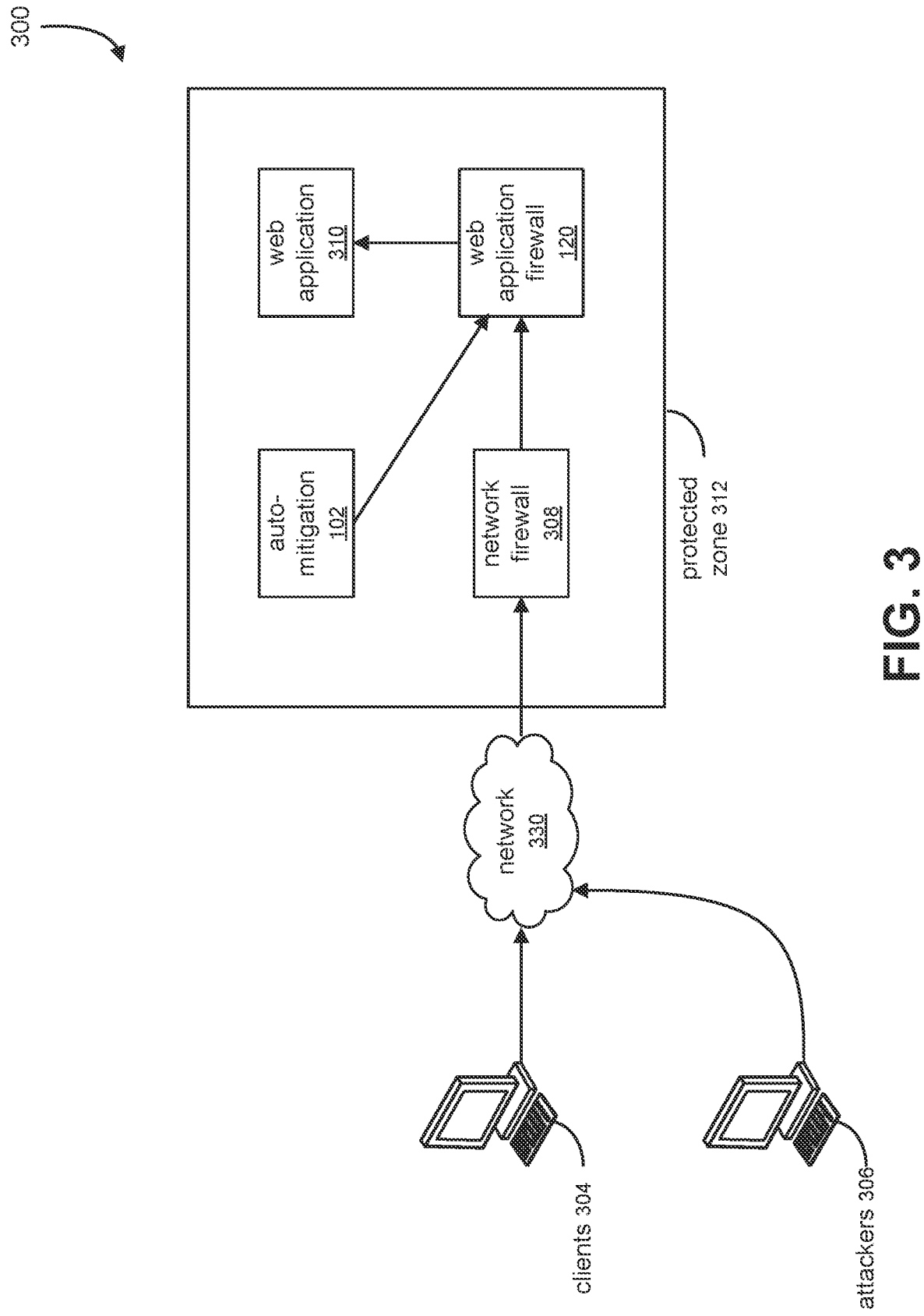
FIG. 3 illustrates an example of a network incorporating a web application firewall and automated attack mitigation, in accordance with an embodiment.

FIG. 3 illustrates an example of a network 300 incorporating a web application firewall and automated attack mitigation, in accordance with an embodiment. As depicted in the example 300, one or more clients 304 utilize a web application 310. Communication between the clients 304 and web application 310 is, for the sake of example 300, presumed to be legitimate and as such, the network 330 traffic associated with this communication is also presumed to be legitimate. However, one or more attackers 306 may also attempt to communicate with the web application 310, in order to disrupt the operation of the web application 310 or interfere with the ability of legitimate clients 304 to interact with the application. Accordingly, for the purpose of example 300, the traffic associated with the attackers 306 is presumed to be illegitimate.

To protect the web application 310, a multilevel security approach may be utilized. In at least one embodiment, this comprises utilization of a network firewall 308 and a web application firewall 120. The network firewall 308 and web application firewall 120 operate at different levels of the OSI model and protect against different types of illegitimate traffic. In at least one embodiment, the network firewall 308 limits the network traffic that is allowed inside or outside of the protected zone 312. The network firewall 308 may, for example, restrict traffic that enters or exits the protected zone 312 to traffic addressed to specific IP ports or IP addresses. However, the action of the network firewall 308 can only mitigate certain types of attacks. In a DDoS attack against web application 310, malicious traffic from attackers 306 can be hard to distinguish from the legitimate traffic from clients 304, since both might be associated with what appears to be valid forms of communication with the web application 310. However, as explained in relation to FIGS. 1 and 2, an auto-mitigation service 102 can derive mitigation rules to configure the web application firewall 120 to mitigate DDoS attacks.

Figure 4:
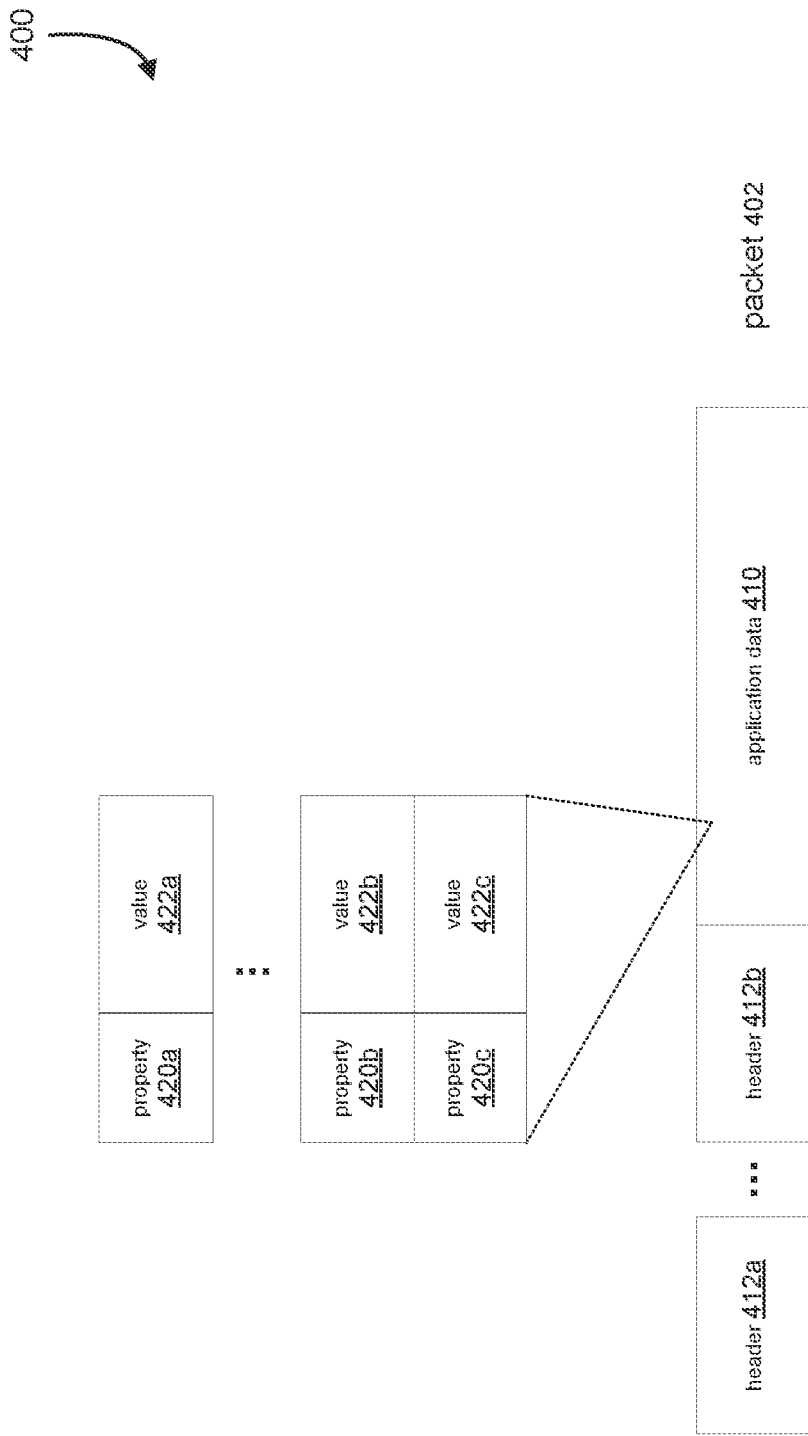
FIG. 4 illustrates an example of application layer properties and network layer properties, in accordance with an embodiment.

In order to derive mitigation rules, embodiments of an auto-mitigation service 102 may inspect application layer properties. FIG. 4 illustrates an example 400 of application layer properties and network layer properties, in accordance with an embodiment. An application layer property, which might also be referred to as a property or attribute, is information related to application layer network traffic or an application to which such traffic is directed. An application layer refers to the level(s) of communication over which applications communicate over a network, such as the application layer of the open systems interconnection ("OSI") model.

As depicted in the example 400, application data 410 may be transmitted as a packet 402 that comprises the application data 410 and some number of headers 412a,b. Note that although example 400 depicts a single packet, in various cases and embodiments application data may be sent over or divided between several such packets. Components operating at lower levels of the OSI model might do so based on inspection of one or more of the headers 412a,b. The possible contents of such headers may, for the most part, be considered limited and well-defined. The application data 410, on the other hand, may include a wide variety of content, corresponding to the essentially limitless number of potential applications. However, the application data can, at least conceptually, be considered to have some number of properties 420a-c and corresponding property values 422a-c. Furthermore, applications may use standardized or published protocols, such as HTTP, that define specific properties. These may be useful when analyzing application layer properties. For example, properties such as user-agent, origin, client-peer, client IP, location, and so may be examined in HTTP requests and analyzed to identify attack signatures. In at least one embodiment, this analysis comprises examining changes in the entropy, or concentration, of properties after the onset of a suspected attack.

Figure 5:
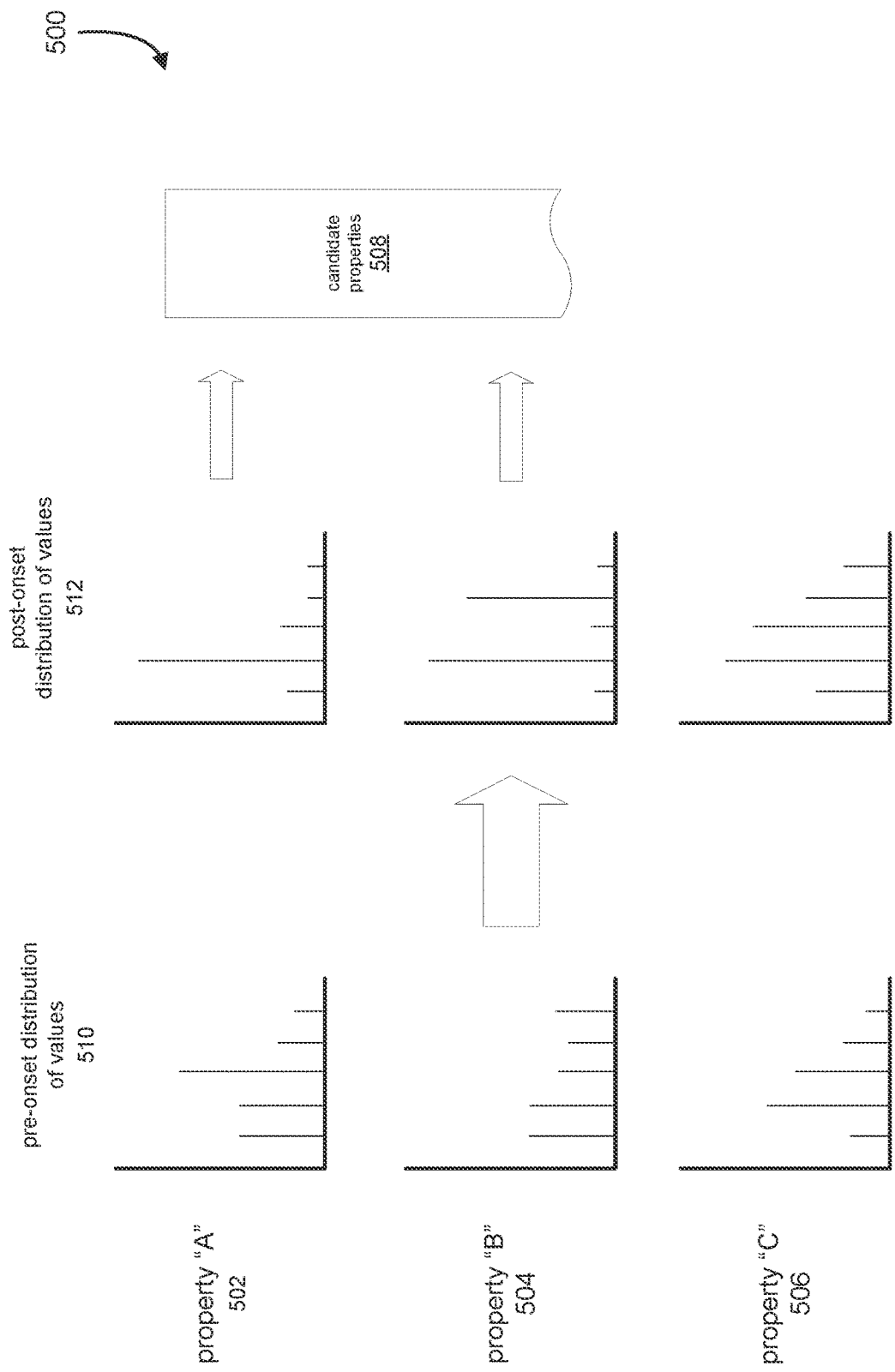
FIG. 5 illustrates an example of entropy reduction and selection of candidate application layer properties, in accordance with an embodiment.

FIG. 5 illustrates an example 500 of entropy reduction and selection of candidate application layer properties, in accordance with an embodiment. In the example 500, three properties "A," "B," and "C" 502-506 are examined by an auto-mitigation service, such as the auto-mitigation service 102 that is depicted in FIG. 1. Using traffic logs, the service may analyze the distribution of values of these properties prior to the onset of a DDoS attack. The pre-onset distributions 510 may or may not have peaks in certain areas, depending on the type of property being evaluated. For example, a property indicating the type of browser used might be expected to have peaks that reflect the predominate popularity of some brands of Internet browsers. In other types of properties, distribution of the values might be more random.

After the suspected onset of a DDoS attack, these distributions may have changed. In the post-onset distributions 512, certain properties may exhibit more concentrated peaks for some values, or sets of values. This could be due to the attacker using a particular type of browser, a particular configuration of browser, being located in a particular region, and so on. In the example 500, the properties "A" and "B" exhibit such changes in concentration, whereas "C" does not. The properties "A" and "B" might therefore be identified as exhibiting a reduction in entropy, and can be considered as candidate properties 508 for consideration in forming a signature of the DDoS attack.

Figure 6:
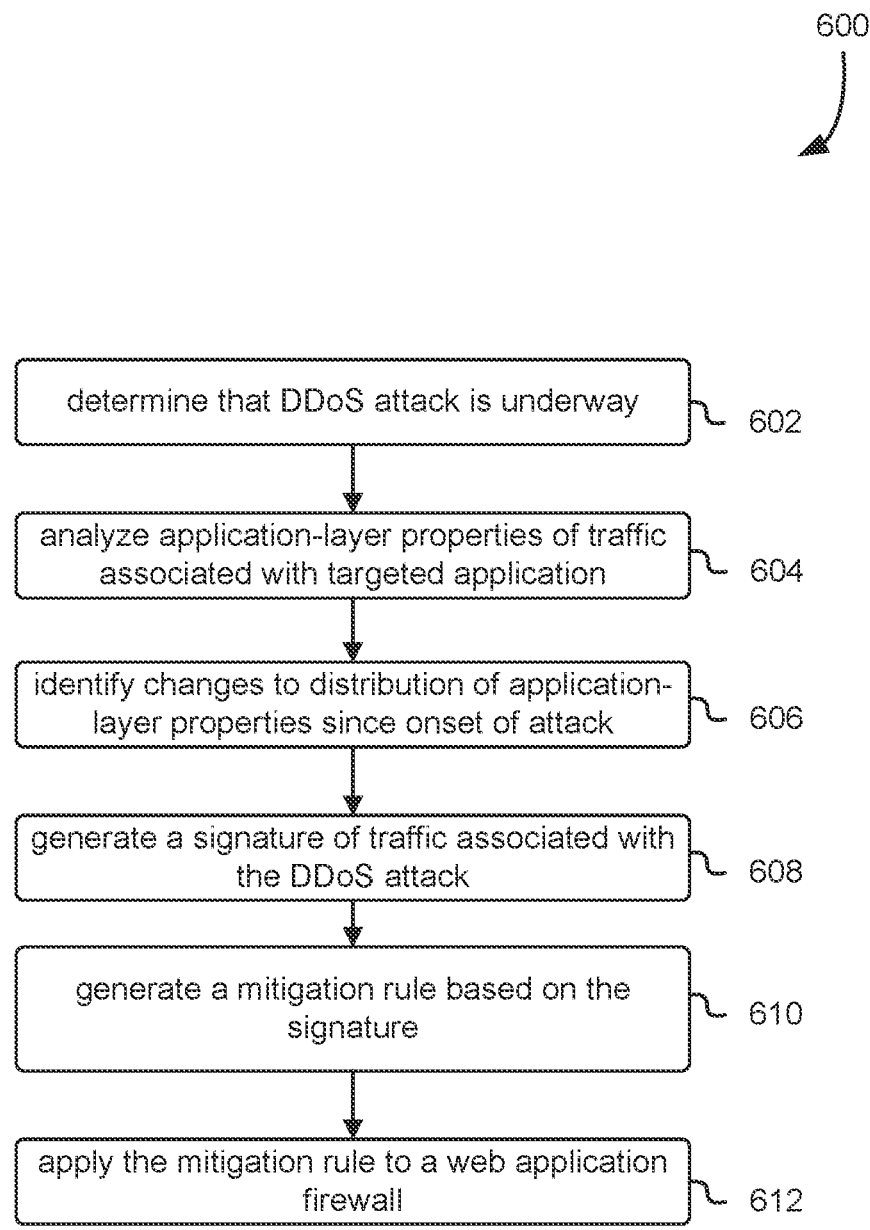
FIG. 6 illustrates an example of a process for automated mitigation of an attack against a web application, in accordance with an embodiment.

FIG. 6 illustrates an example of a process 600 for automated mitigation of an attack against a web application, in accordance with an embodiment. Although the example procedure 600 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another.

Figure 7:
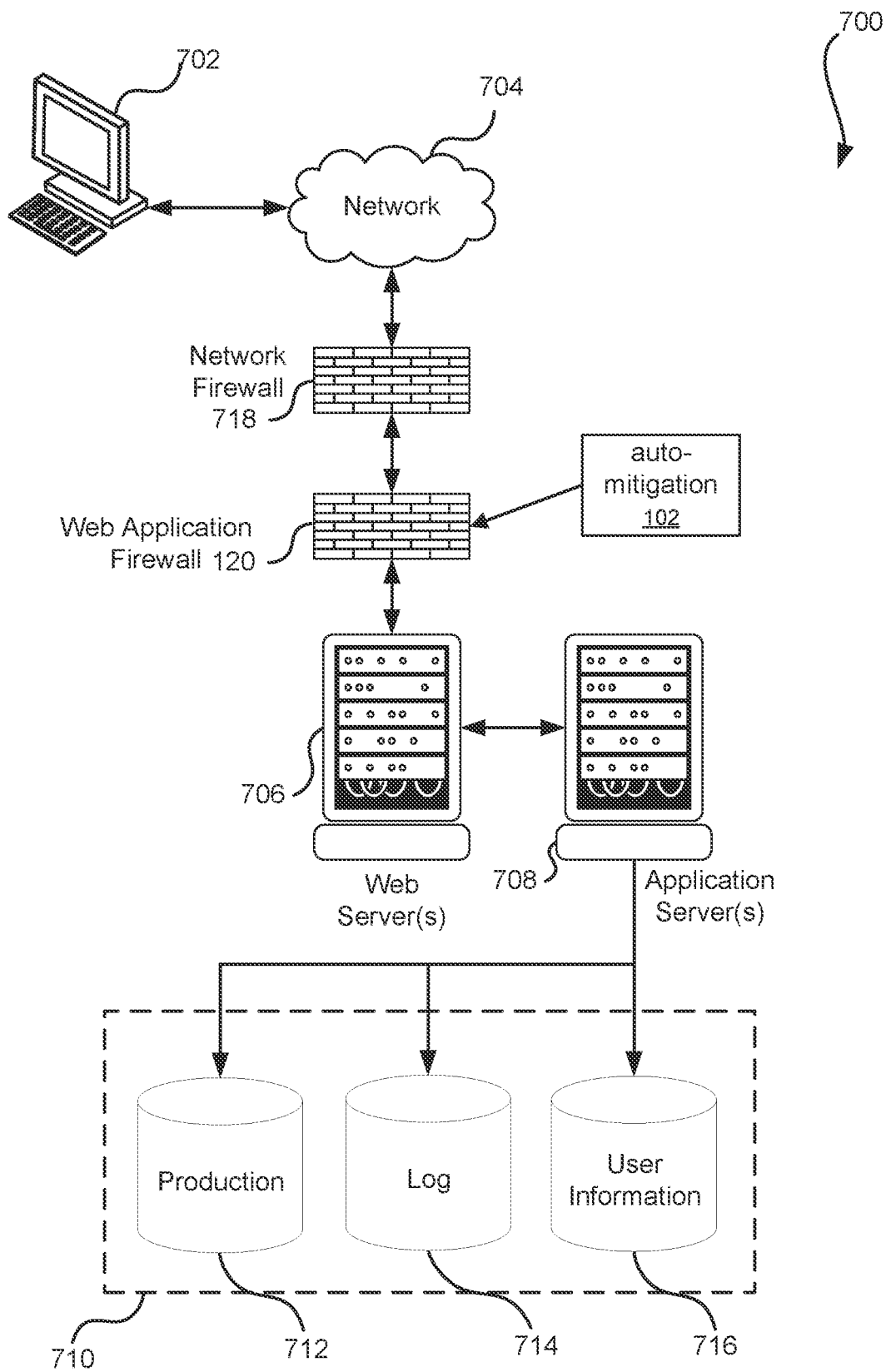
FIG. 7 illustrates a system in which various embodiments can be implemented.

In at least one embodiment, the steps or operations of FIG. 6 are implemented by an auto-mitigation service, such as the auto-mitigation service depicted in FIG. 1. This service may be implemented by any suitable hardware or combination of hardware. In at least one embodiment, a distributed system such as the one depicted in FIG. 7 is used.

At 602, the auto-mitigation service determines that a DDoS attack is underway. In at least one embodiment, an example system, such as the auto-mitigation service 102 depicted in FIG. 1, determines that one or more web applications are targets of a distributed denial of service attack.

At 604, the auto-mitigation service analyzes application layer properties of network traffic associated with a targeted application. In at least one embodiment, the system analyzes logs of network traffic from before and after the time of onset for the suspected DDoS, and identifies changes or trends to the concentration of values of these properties over time.

At 606, the auto-mitigation service identifies changes to the distribution, or entropy, of application layer properties since the onset of the suspected attack. In at least one embodiment, this comprises identifying changes to distribution of values for application layer properties associated with the targeted web application.

At 608, the auto-mitigation service generates a signature of traffic that is associated with the DDoS attack. The signature comprises the values of one or more application layer properties identified, at 606, as exhibiting changes in entropy or distribution since the onset of the attack.

In at least one embodiment, the system generates a number of candidate signatures, representing different combinations of properties, and evaluates the various candidate signatures. The evaluation comprises determining whether the signature encompasses a sufficient proportion of traffic associated with the period subsequent to the onset of the DDoS attack, and whether the signature excludes a sufficient proportion of traffic associated with the pre-onset period. A signature or its properties may be said to exclude traffic when the traffic does not have properties match the signature, and may be said to include traffic when the traffic has property that match the signature.

At 610, the auto-mitigation service generates a mitigation rule based on the signature. The mitigation rule may identify, by the signature, traffic that is suspected to be associated with the DDoS attack, in that it is believed to be originated by the entity behind the attack. Traffic is said to match or conform to a signature when the property values specified by the signature are equal to those found in the network traffic. In some cases and embodiments, a rule may specify a range of values for a property, rather than a precise value.

At 612, the mitigation rule is applied to the web application firewall. An auto-mitigation rule, when applied by the web application firewall, can cause the web application firewall to block traffic that conforms to the signature. In some cases and embodiments, the traffic may be re-routed, logged, or otherwise subjected to special handling.

As one skilled in the art will appreciate in light of this disclosure, certain embodiments may be capable of achieving certain advantages, including more efficiently countering DDoS attacks or other anomalous network traffic, reducing non-attack traffic affected by attack mitigation, and increasing system reliability.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one network firewall 718 and at least one web application firewall 120. The network firewall 718 and web application firewall 120 operate at different levels of the OSI model and protect against different types of potentially illegitimate traffic. In at least one embodiment, the network firewall 718 limits the network traffic that is allowed inside or outside of a protected zone. The network firewall 718 may, for example, restrict traffic that enters the protected zone from network 704. It may, for example, only admit traffic addressed to specific IP ports or IP addresses. However, the action of the network firewall 718 only mitigates certain types of attacks. In a DDoS attack against a web application, such as one hosted on web server 706, malicious traffic from an attacker could be difficult to distinguish from legitimate traffic, since both might be associated with what appears to be valid forms of communication with the web server 707. However, the web application firewall 120 can be configured to mitigate DDoS attacks. Further, an auto-mitigation service 102 may automatically derive rules for mitigating the impact of such attacks.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The present disclosure may be further understood in view of the following clauses:

1. A system, comprising:
   at least one processor; and
   memory that stores computer-executable instructions that, in response to execution by the at least one processor, cause the system to:
   determine that one or more web applications are targets of a distributed denial of service attack;
   analyze application layer properties of network traffic associated with the one or more web applications;
   identify one or more changes to distributions of the application layer properties of the network traffic associated with the one or more web applications, the one or more changes relative to an estimated onset of the distributed denial of service attack;
   generate a signature of network traffic associated with the distributed denial of service attack, the signature comprising one or more of the application layer properties whose distributions changed; and
   generate an attack mitigation rule that, when applied by a web application firewall, limits network traffic that conforms to the signature.

2. The system of clause 1, wherein the one or more application layer properties are selected for inclusion in the signature based, at least in part, on a reduction in entropy associated with values of the one or more application layer properties.

3. The system of clauses 1 or 2, wherein the one or more application layer properties are selected for inclusion in the signature based, at least in part, on an amount of the network traffic that conform to the one or more application layer properties.

4. The system of any of clauses 1-3, the memory comprising further computer-executable instructions that, in response to execution by the at least one processor, cause the system to at least:
   initiate an attack mitigation workflow in response to determining that one or more web applications are targets of a distributed denial of service attack, wherein the attack mitigation workflow comprises generating the signature and the attack mitigation rule.

5. The system of any of clauses 1-4, the memory comprising further computer-executable instructions that, in response to execution by the at least one processor, cause the system to at least:

determine a first amount of network traffic processed subsequent to a suspected onset time of the distributed denial of service attack that would conform to the signature;

determine a second amount of network traffic processed prior to a suspected onset time of the distributed denial of service attack that would conform to the signature; and select the one or more of the application layer properties to include in the signature based, at least in part, on the first and second amounts of network traffic.

6. A method, comprising:

determining that a web application is a target of a distributed denial of service attack;

identifying changes to distributions of application layer properties of network traffic associated with the web application, the changes relative to an estimated onset of the distributed denial of service attack;

identifying, based at least in part on the changes to the distributions, one or more application layer properties identifying network traffic associated with the distributed denial of service attack; and generating an attack mitigation rule to limit network traffic with properties corresponding to the identified one or more application layer properties.

7. The method of claim 6, wherein the one or more application properties are selected based, at least in part, on the one or more application properties excluding traffic received before the estimated onset of the distributed denial of service attack.

8. The method of clauses 6 or 7, wherein determining that the web application is a target of a distributed denial of service attack comprising identifying an increase in an amount of traffic directed at the web application, and wherein the identified one or more application layer properties are associated with a proportion of the increased amount of traffic that is above a threshold amount.

9. The method of any of clauses 6-8, further comprising determining an amount of traffic directed to the web application that is not associated with the identified one or more application layer properties.

10. The method of any of clauses 6-9, further comprising identifying the one or more application layer properties based, at least in part, on an amount network traffic that conforms to the one or more application layer properties.

11. The method of any of clauses 6-10, further comprising initiating an attack mitigation workflow in response to determining that the web application is a target of the distributed denial of service attack.

12. The method of any of clauses 6-11, further comprising configuring a web application firewall based, at least in part on the attack mitigation rule.

13. The method of any of clauses 6-12, wherein the one or more application layer properties are identified based, at least in part, on a subset of application layer properties identified as preferable for inclusion in a signature.

14. A non-transitory computer-readable storage medium storing thereon executable instructions that, as a result of being executed by one or more processors of a computer system, cause the computer system to at least:

determine that a web application is a target of a distributed denial of service attack;

identify changes to distributions of application layer properties of network traffic associated with the one or more web applications, the change relative to an estimated onset of the distributed denial of service attack;

identify, based at least in part on the changes to distributions, one or more application layer properties indicative of network traffic associated with the distributed denial of service attack;

generate a signature comprising at least a subset of the one or more application layer properties; and generate an attack mitigation rule to limit network traffic with properties corresponding to the signature.

15. The non-transitory computer-readable storage medium of clause 14, wherein the subset of one or more application layer properties included in the signature are selected to maximize a first amount of traffic directed to the web application after a suspected onset time of the attack, and to minimize a second amount of traffic directed to the web application prior to the suspected onset time of the attack, wherein the first amount of traffic is estimated to be associated with the attack.

16. The non-transitory computer-readable storage medium of clauses 14 or 15, wherein the instructions further comprise instructions that, as a result of being executed by the one or more processors, cause the computer system to:

identify an increase in an amount of traffic directed at the web application; and determine that the one or more application layer properties are associated with a proportion of the increased amount of traffic that is above a threshold amount.

17. The non-transitory computer-readable storage medium of any of clauses 14-16, wherein the instructions further comprise instructions that, as a result of being executed by the one or more processors, cause the computer system to:

determine an amount of traffic directed to the web application that is not associated with the identified one or more application layer properties; and exclude one or more application layer properties from the signature based, at least in part, on the determined amount of traffic.

18. The non-transitory computer-readable storage medium of any of clauses 14-17, wherein the instructions further comprise instructions that, as a result of being executed by the one or more processors, cause the computer system to:

identify the one or more application layer properties based, at least in part, on an amount network traffic that conforms to the one or more application layer properties.

19. The non-transitory computer-readable storage medium of any of clauses 14-18, wherein the instructions further comprise instructions that, as a result of being executed by the one or more processors, cause the computer system to:

start an attack mitigation workflow in response to determining that the web application is a target of the distributed denial of service attack.

20. The non-transitory computer-readable storage medium of any of clauses 14-19, wherein the instructions further comprise instructions that, as a result of being executed by the one or more processors, cause the computer system to:

cause a web application firewall to be configured based, at least in part on the attack mitigation rule, to protect the web application under attack.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   memory that stores computer-executable instructions that, in response to execution by the at least one processor, cause the system to:
   determine that one or more web applications are targets of a distributed denial of service attack;
   analyze application layer properties of network traffic associated with the one or more web applications;
   identify one or more changes to distributions of the application layer properties of the network traffic associated with the one or more web applications, the one or more changes identified based at least in part on comparing pre-onset distributions from before the distributed denial of service attack is determined to post-onset distributions from after the distributed denial of service attack is determined;
   generate a signature of network traffic associated with the distributed denial of service attack, the signature comprising one or more of the application layer properties whose distributions changed; and
   generate a new attack mitigation rule based at least in part on the generated signature of network traffic associated with the distributed denial of service attack and the one or more of the application layer properties whose distributions changed, that when applied by a web application firewall, limits network traffic that conforms to the signature.

2. The system of claim 1, wherein the one or more of the application layer properties whose distribution has changed are selected for inclusion in the signature based, at least in part, on a reduction in entropy associated with values of the one or more application layer properties.

3. The system of claim 1, wherein application layer properties included in the signature are selected to maximize a first amount of traffic directed to the one or more web applications after a suspected onset time of the attack, and to minimize a second amount of traffic directed to the one or more web applications prior to the suspected onset time of the attack.

4. The system of claim 1, the memory comprising further computer-executable instructions that, in response to execution by the at least one processor, cause the system to at least:
   initiate an attack mitigation workflow in response to determining that one or more web applications are targets of a distributed denial of service attack, wherein the attack mitigation workflow comprises generating the signature and the attack mitigation rule.

5. The system of claim 1, the memory comprising further computer-executable instructions that, in response to execution by the at least one processor, cause the system to at least:
   determine a first amount of network traffic processed subsequent to a suspected onset time of the distributed denial of service attack that would conform to the signature;
   determine a second amount of network traffic processed prior to a suspected onset time of the distributed denial of service attack that would conform to the signature; and
   select the one or more of the application layer properties to include in the signature based, at least in part, on the first and second amounts of network traffic.

6. A method, comprising:
   determining that a web application is a target of a distributed denial of service attack;
   identifying changes to distributions of application layer properties of network traffic associated with the web application from before and after the distributed denial of service attack, the changes relative to an estimated onset of the distributed denial of service attack;
   selecting, based at least in part on the changes to the distributions, one or more application layer properties identifying network traffic associated with the distributed denial of service attack; and
   generating a new attack mitigation rule to limit network traffic with properties corresponding to the selected one or more application layer properties, the new attack mitigation rule generated based at least in part on the one or more application layer properties.

7. The method of claim 6, wherein the selected one or more application layer properties are selected based, at least in part, on the selected one or more application properties excluding traffic received before the estimated onset of the distributed denial of service attack.

8. The method of claim 6, wherein determining that the web application is a target of a distributed denial of service attack comprising identifying an increase in an amount of traffic directed at the web application, and wherein the selected one or more application layer properties are associated with a proportion of the increase in the amount of traffic that is above a threshold amount.

9. The method of claim 6, further comprising determining an amount of traffic directed to the web application that is not associated with the selected one or more application layer properties.

10. The method of claim 6, further comprising selecting the one or more application layer properties based, at least in part, on an amount of network traffic that conforms to the selected one or more application layer properties.

11. The method of claim 6, further comprising initiating an attack mitigation workflow in response to determining that the web application is a target of the distributed denial of service attack.

12. The method of claim 6, further comprising configuring a web application firewall based, at least in part, on the attack mitigation rule.

13. The method of claim 6, wherein the selected one or more application layer properties are selected based, at least in part, on a subset of application layer properties identified as preferable for inclusion in a signature.

14. A non-transitory computer-readable storage medium storing thereon executable instructions that, as a result of being executed by one or more processors of a computer system, cause the computer system to at least:
   determine that a web application is a target of a distributed denial of service attack;
   identify changes to distributions of application layer properties of network traffic associated with the one or more web applications based at least in part on a comparison to pre-onset distributions from before the distributed denial of service attack, the changes relative to an estimated onset of the distributed denial of service attack;

identify, based at least in part on the changes to distributions, one or more application layer properties indicative of network traffic associated with the distributed denial of service attack;

generate a signature comprising at least a subset of the identified one or more application layer properties; and generate a new attack mitigation rule to limit network traffic with properties corresponding to the signature, the new attack mitigation rule generated based at least in part on the signature.

15. The non-transitory computer-readable storage medium of claim 14, wherein the subset of the identified one or more application layer properties included in the signature are selected to maximize a first amount of traffic directed to the web application after a suspected onset time of the attack, and to minimize a second amount of traffic directed to the web application prior to the suspected onset time of the attack, wherein the first amount of traffic is estimated to be associated with the attack.

16. The non-transitory computer-readable storage medium of claim 14, wherein the executable instructions further comprise instructions that, as a result of being executed by the one or more processors, cause the computer system to:

identify an increase in an amount of traffic directed at the web application; and determine that the subset of the identified one or more application layer properties are associated with a proportion of the increase in the amount of traffic that is above a threshold amount.

17. The non-transitory computer-readable storage medium of claim 14, wherein the executable instructions further comprise instructions that, as a result of being executed by the one or more processors, cause the computer system to:

determine an amount of traffic directed to the web application, prior to onset of the attack, that is not associated with the identified one or more application layer properties; and exclude one or more application layer properties from the signature based, at least in part, on the determined amount of traffic.

18. The non-transitory computer-readable storage medium of claim 14, wherein the executable instructions further comprise instructions that, as a result of being executed by the one or more processors, cause the computer system to:

identify the subset of the identified one or more application layer properties based, at least in part, on an amount of network traffic that conforms to the one or more application layer properties.

19. The non-transitory computer-readable storage medium of claim 14, wherein the executable instructions further comprise instructions that, as a result of being executed by the one or more processors, cause the computer system to:

start an attack mitigation workflow in response to determining that the web application is a target of the distributed denial of service attack.

20. The non-transitory computer-readable storage medium of claim 14, wherein the instructions further comprise instructions that, as a result of being executed by the one or more processors, cause the computer system to:

cause a web application firewall to be configured based, at least in part on the attack mitigation rule, to protect the web application under attack.

\* \* \* \* \*